(12) United States Patent
Lee et al.

(10) Patent No.: US 12,496,395 B2
(45) Date of Patent: Dec. 16, 2025

(54) BOLUS PERMISSIONS AND PRIORITIZATION SCHEME FOR INFUSION PUMP SYSTEM

(71) Applicant: Tandem Diabetes Care, Inc., San Diego, CA (US)

(72) Inventors: Dwight Lee, San Diego, CA (US); Christopher Jung, San Diego, CA (US); Amanda Lennard, San Diego, CA (US); Garrett Marin, San Diego, CA (US)

(73) Assignee: Tandem Diabetes Care, Inc., San Diego, CA (US)

( * ) Notice: Subject to any disclaimer, the term of this patent is extended or adjusted under 35 U.S.C. 154(b) by 489 days.

(21) Appl. No.: 18/071,835

(22) Filed: Nov. 30, 2022

(65) Prior Publication Data

US 2023/0166033 A1 Jun. 1, 2023

Related U.S. Application Data (60) Provisional application No. 63/284,303, filed on Nov. 30, 2021.

(51) Int. Cl.
*A61M 5/172* (2006.01)
*A61M 5/142* (2006.01)

(52) U.S. Cl.
CPC ........ *A61M 5/172* (2013.01); *A61M 5/14244* (2013.01); *A61M 2202/0486* (2013.01); *A61M 2205/502* (2013.01); *A61M 2205/52* (2013.01)

(58) Field of Classification Search
CPC .............. A61M 5/172; A61M 5/14244; A61M 2202/0486; A61M 2205/502;
(Continued)

(56) References Cited

U.S. PATENT DOCUMENTS 6,469,991 B1 10/2002 Sone et al.
2012/0095311 A1\* 4/2012 Ramey .............. A61M 5/14244
600/365

(Continued)

FOREIGN PATENT DOCUMENTS

JP 2013-517871 A 5/2013
JP 2017-521107 A 8/2017
(Continued)

OTHER PUBLICATIONS

International Search Report and Written Opinion for Related International App. No. PCT/US2022/051317, dated Apr. 17, 2023, 10 pages.

(Continued)

*Primary Examiner* — Theodore J Stigell
(74) *Attorney, Agent, or Firm* — Morgan, Lewis & Bockius LLP (57) ABSTRACT

In an infusion pump system that includes a pump that may have a user interface for pump programming, one or more smartphones or other remote control devices that interface with the infusion pump, and/or an automated insulin delivery algorithm, there is a potential conflict between commands such as boluses being programmed on multiple devices and/or calculated by the AID algorithm at the same time. In order to avoid low glucose levels that could result from delivering multiple boluses from these various sources when only one bolus is needed, systems and methods disclosed herein provide a bolus permissions and prioritization scheme that prioritizes boluses programmed with the infusion pump and one or more remote control devices and calculated by a closed loop delivery algorithm.

20 Claims, 10 Drawing Sheets

(58) Field of Classification Search
CPC .... A61M 2205/52; A61M 2005/14208; A61M 5/142; A61M 5/1723; A61M 2209/01
See application file for complete search history.

(56) References Cited

U.S. PATENT DOCUMENTS

2015/0182297 A1   7/2015   Sandhu et al.
2021/0001044 A1   1/2021   Michaud et al.

FOREIGN PATENT DOCUMENTS

| WO | 2012-049238 A1 | 4/2012 |
| WO | 2012-049240 A1 | 4/2012 |
| WO | 2015/077320 A1 | 5/2015 |
| WO | 2020/216664 A1 | 10/2020 |

OTHER PUBLICATIONS

European Search Report for related EP Application No. 22902101.9, mailed Nov. 5, 2025, 9 pages.

\* cited by examiner

BOLUS PERMISSIONS AND PRIORITIZATION SCHEME FOR INFUSION PUMP SYSTEM

RELATED APPLICATION

The present application claims the benefit of U.S. Provisional Application No. 63/284,303, filed Nov. 30, 2021, which is hereby incorporated herein in its entirety by reference.

TECHNICAL FIELD

The present disclosure relates generally to ambulatory infusion pump systems and, more particularly, to programming of ambulatory infusion pumps.

BACKGROUND

There are a wide variety of medical treatments that include the administration of a therapeutic fluid in precise, known amounts at predetermined intervals. Devices and methods exist that are directed to the delivery of such fluids, which may be liquids or gases, are known in the art.

One category of such fluid delivery devices includes insulin injecting pumps developed for administering insulin to patients afflicted with type 1, or in some cases, type 2 diabetes. Some insulin injecting pumps are configured as portable or ambulatory infusion devices that can provide continuous subcutaneous insulin injection and/or infusion therapy as an alternative to multiple daily insulin injections via syringe or injector pen. Such ambulatory infusion pumps may be worn by the user, may use replaceable medicament cartridges, and may deliver other medicaments alone, or in combination with insulin. Such medicaments include glucagon, pramlintide, and the like. Examples of such pumps and various features associated therewith include those disclosed in U.S. Patent Publication Nos. 2013/0324928 and 2013/0053816 and U.S. Pat. Nos. 8,287,495; 8,573,027; 8,986,253; and 9,381,297, each of which is incorporated herein by reference in its entirety.

With the proliferation of handheld electronic devices, such as mobile phones (e.g., smartphones), there is a desire to be able to remotely utilize such devices, as well as dedicated wireless controllers designed to work with one or more infusion pumps and/or types of infusion pumps, to optimize usage of infusion pumps. These remote controllers would enable a pump to be monitored, programmed and/or operated more privately, more conveniently and more comfortably. Accordingly, one potential use of dedicated remote devices and handheld consumer electronic devices (such as smartphones, tablets and the like) is to utilize such devices as controllers for remotely programming and/or operating infusion pumps. However, in situations where an infusion pump can be programmed from more than one device, including the pump itself, there can be issues with a pump receiving commands from multiple devices at or about the same time.

SUMMARY

In an infusion pump system that includes a pump that may have a user interface for pump programming, one or more smartphones or other remote control devices that interface with the infusion pump, and/or an automated insulin delivery algorithm, there is a potential conflict between commands such as boluses being programmed on multiple devices and/or calculated by the AID algorithm at the same time. In order to avoid low glucose levels that could result from delivering multiple boluses from these various sources when only one bolus is needed, systems and methods disclosed herein provide a bolus permissions and prioritization scheme that prioritizes boluses programmed with the infusion pump and one or more remote control devices and calculated by a closed loop delivery algorithm.

In an embodiment, an ambulatory infusion pump system can include an infusion pump configured to deliver medicament to a user and having a user interface configured to display a pump bolus programming interface configured to enable the user to program a bolus delivery of medicament with the infusion pump. The system can further include a remote control device configured to send commands to the infusion pump to cause delivery of medicament with the infusion pump including a user interface configured to display a remote bolus programming interface configured to enable the user to program a bolus delivery of medicament with the infusion pump. At least one processor in the system can be configured to associate each of the pump bolus programming interface and the remote bolus programming interface with a priority level such that one of the pump bolus programming interface and the remote bolus programming interface is a higher priority interface and the other is a lower priority interface. The processor can further automatically disable user access to the lower priority interface if the higher priority interface has been accessed.

In an embodiment, an ambulatory infusion pump system can include an infusion pump configured to deliver medicament to a user, a first user interface configured to display a first bolus programming interface to enable the user to program a bolus delivery of medicament with the infusion pump and a second user interface configured to display a second bolus programming interface to enable the user to program a bolus delivery of medicament with the infusion pump. At least one processor can be configured to associate each of the first bolus programming interface and the second bolus programming interface with a priority level such that one of the first bolus programming interface and the second bolus programming interface is a higher priority interface and the other is a lower priority interface. The at least one processor can automatically disable user access to the lower priority interface if the higher priority interface has been accessed.

BRIEF DESCRIPTION OF THE DRAWINGS

The disclosure may be more completely understood in consideration of the following detailed description of various embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The following detailed description should be read with reference to the drawings in which similar elements in different drawings are numbered the same. The drawings, which are not necessarily to scale, depict illustrative embodiments and are not intended to limit the scope of the disclosure.

Figure 1:
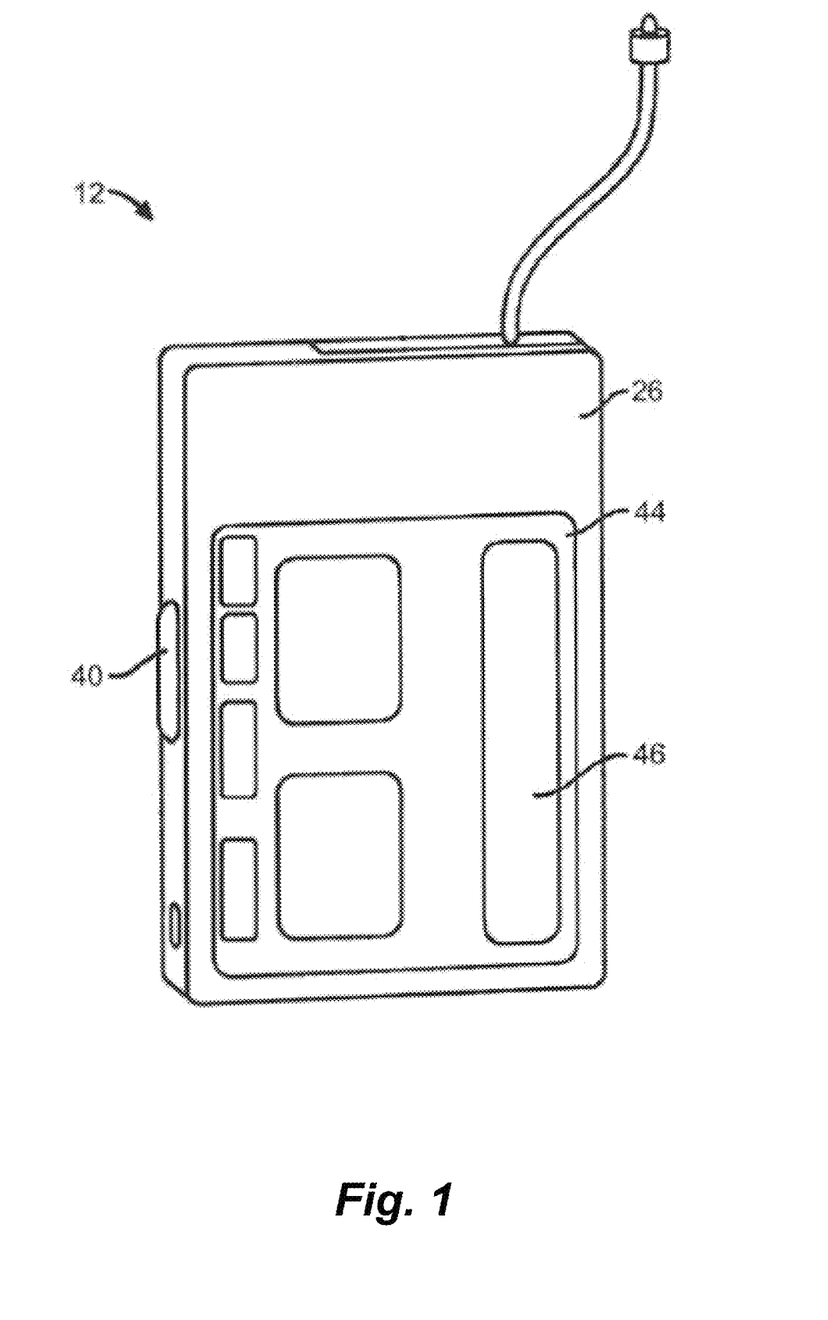
FIG. 1 is an embodiment of an ambulatory infusion pump for use with embodiments of the disclosure.

FIG. 1 depicts an example infusion pump that can be used in conjunction with one or more embodiments of the ambulatory infusion pump system of the present disclosure. Pump 12 includes a pumping or delivery mechanism and reservoir for delivering insulin or other medicaments to a patient and an output/display 44. The output/display 44 may include an interactive and/or touch sensitive screen 46 having an input device such as, for example, a touch screen comprising a capacitive screen or a resistive screen. The pump 12 may additionally or instead include one or more of a keyboard, a microphone or other input devices known in the art for data entry, some or all of which may be separate from the display. The pump 12 may also include a capability to operatively couple to one or more other display devices such as a remote display (e.g., a dedicated remote display or a CGM display), a remote control device, or a consumer electronic device (e.g., laptop computer, personal computer, tablet computer, smartphone, electronic watch, electronic health or fitness monitor, or personal digital assistant). Further details regarding such pump devices can be found in U.S. Pat. No. 8,287,495, previously incorporated by reference above. It is to be appreciated that pump 12 may be optionally configured to deliver one or more additional or other medicaments to a patient.

Figure 2:
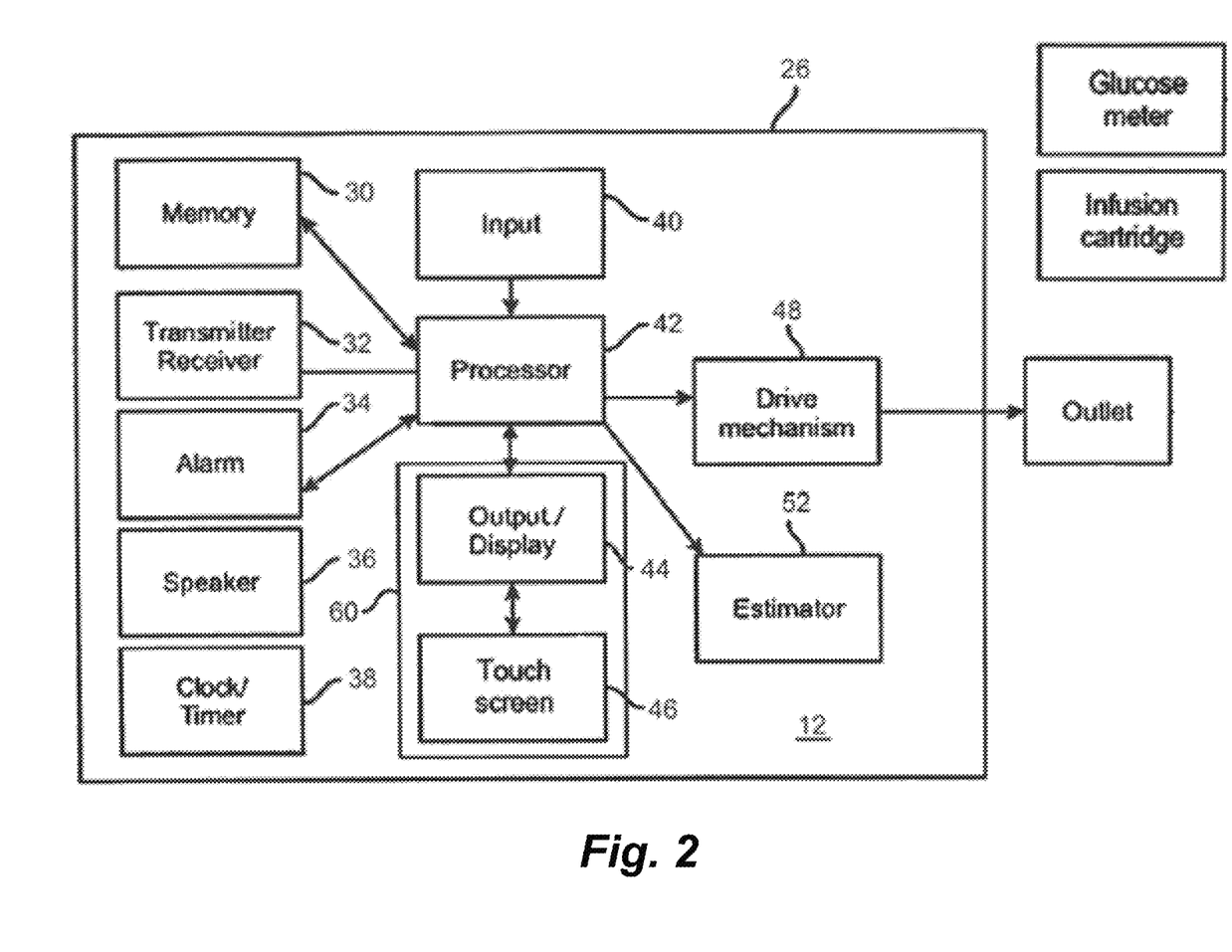
FIG. 2 is a block diagram of the ambulatory infusion pump of FIG. 1.

FIG. 2 illustrates a block diagram of some of the features that may be included within the housing 26 of pump 12. The pump 12 can include a processor 42 that controls the overall functions of the pump. The pump 12 may also include, e.g., a memory device 30, a transmitter/receiver 32, an alarm 34, a speaker 36, a clock/timer 38, an input device 40, a user interface suitable for accepting input and commands from a user such as a caregiver or patient, a drive mechanism 48, an estimator device 52 and a microphone (not pictured). One embodiment of a user interface is a graphical user interface (GUI) 60 having a touch sensitive screen 46 with input capability. In some embodiments, the processor 42 may communicate with one or more other processors within the pump 12 and/or one or more processors of other devices through the transmitter/receiver 32 such as a remote device (e.g., CGM device), a remote control device, or a consumer electronic device. In some embodiments, the communication is effectuated wirelessly, by way of example only, via a near field communication (NFC) radio frequency (RF) transmitter or a transmitter operating according to a "Wi-Fi" or Bluetooth® protocol, Bluetooth® low energy protocol or the like. The processor 42 may also be programmed to receive signals and/or other data from an input device, such as, by way of example, a pressure sensor, a temperature sensor, accelerometer, GPS receiver, or the like.

Figure 3A:
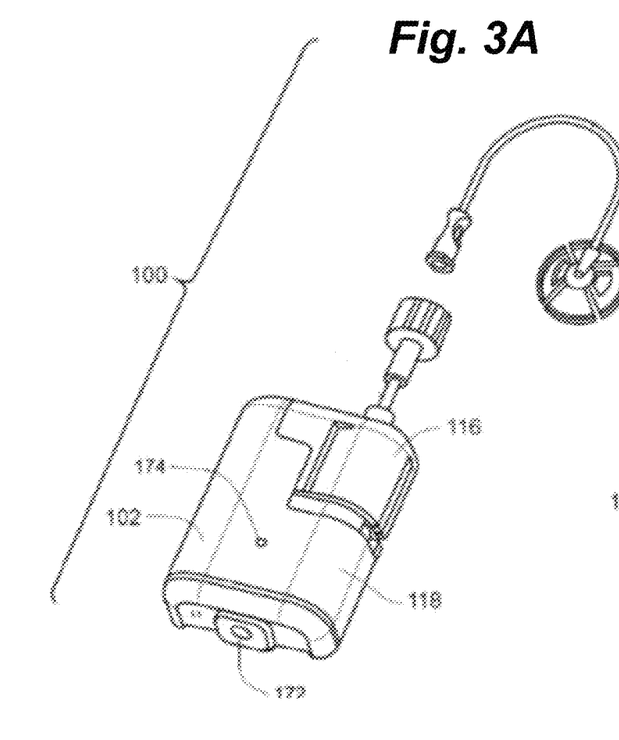
FIGS. 3A-3B are an alternate embodiment of an ambulatory infusion pump for use with embodiments of the disclosure.
Figure 3B:
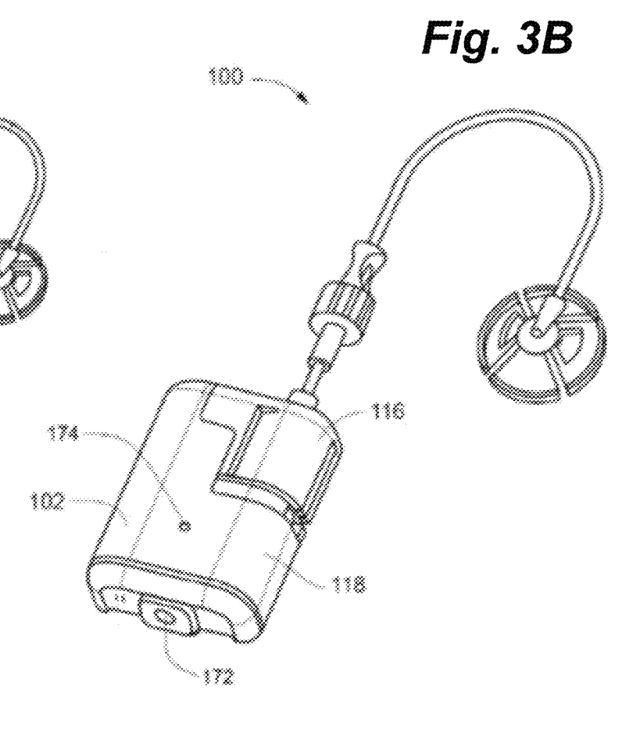

FIGS. 3A-3B depicts another infusion pump that can be used in conjunction with one or more embodiments of the ambulatory infusion pump system of the present disclosure. Pump 102 includes a pump drive unit 118 and a medicament cartridge 116. Pump 102 also includes a processor that controls some or all of the operations of the pump. The processor may communicate with one or more processors within the pump 102 and/or one or more processors of other devices. The processor may also include programming to receive signals and/or other data from an input device, such as, by way of example, a pressure sensor, a temperature sensor, or the like. In some embodiments, pump 102 receive commands from a separate device for control of some or all of the operations of the pump. Such separate device can include, for example, a dedicated remote control device or a consumer electronic device such as a smartphone having a processor executing an application configured to enable the device to transmit operating commands to the processor of pump 102. In some embodiments, processor can also transmit information to one or more separate devices, such as information pertaining to device parameters, alarms, reminders, pump status, etc. Such separate device can include any remote display, remote control device, or a consumer electronic device as described above. Pump 102 can also incorporate any or all of the features described with respect to pump 12 in FIG. 2. In some embodiments, the communication is effectuated wirelessly. Some such pumps 12 can further include one or more of an input button 172 and one or more indicator lights 174. Further details regarding such pumps can be found in U.S. Pat. No. 10,279,106 and U.S. Patent Publication Nos. 2016/0339172 and 2017/0049957, each of which is hereby incorporated herein by reference in its entirety.

Figure 4:
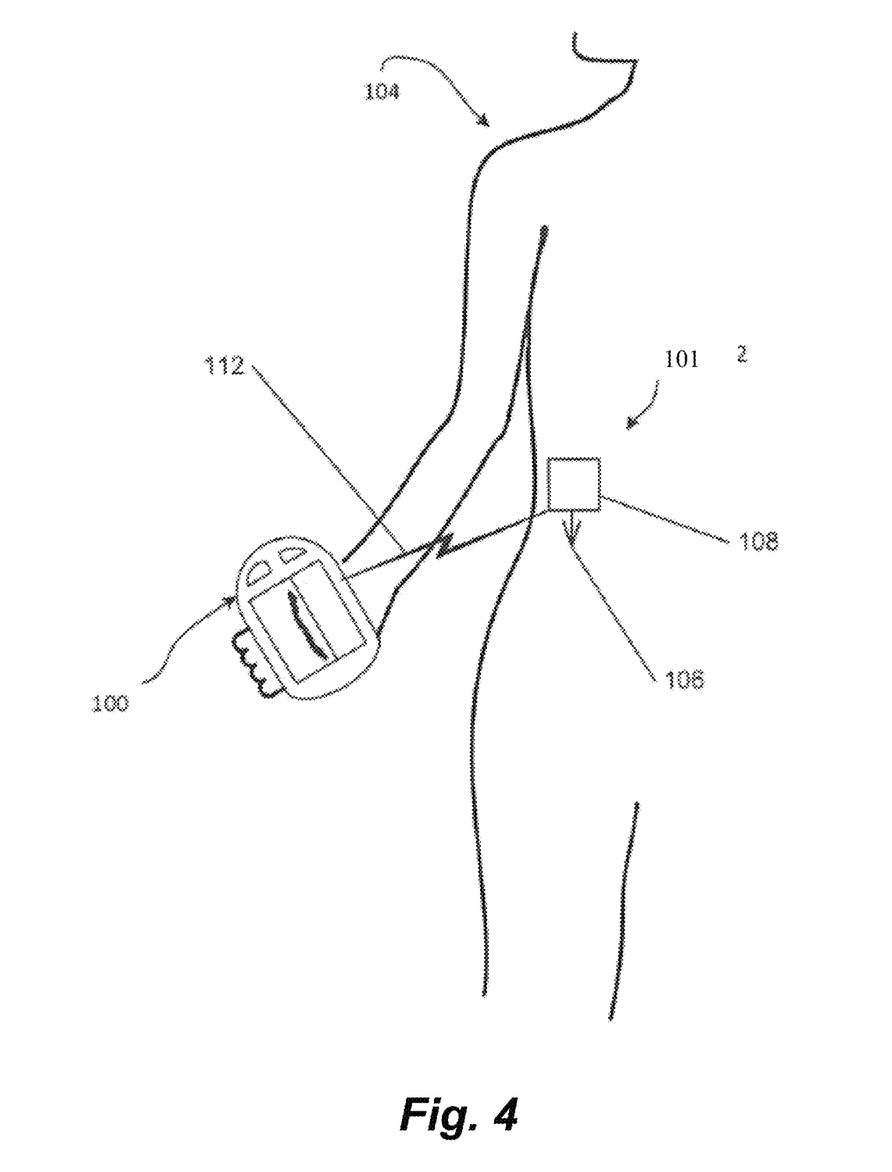
FIG. 4 depicts an embodiment of an infusion pump system according to the disclosure.
Figure 5A:
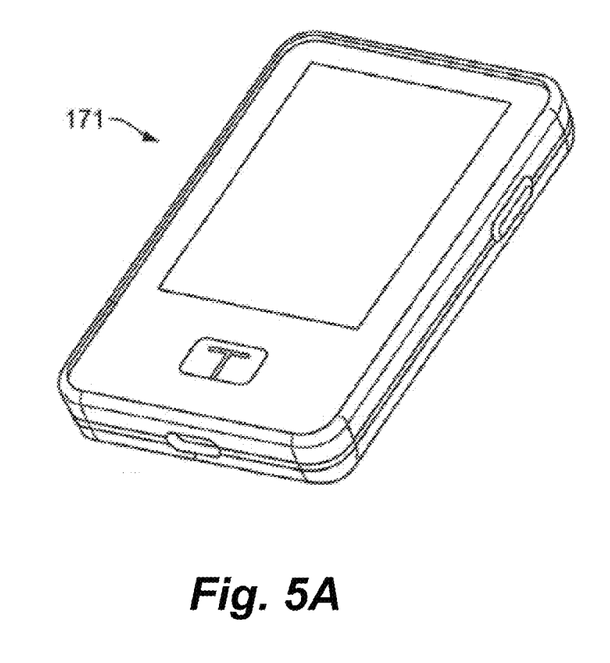
FIGS. 5A-5B depict remote control devices for an infusion pump system according to the disclosure.
Figure 5B:
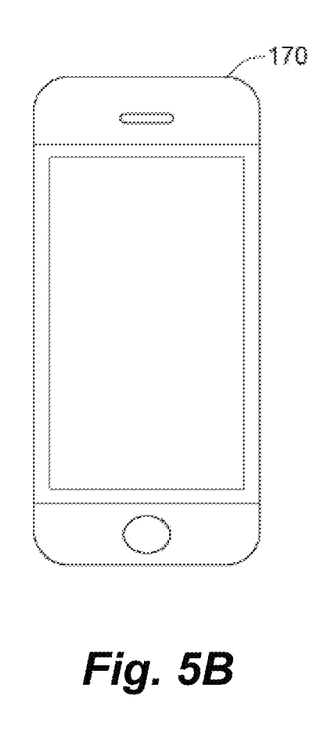

Referring to FIGS. 4-5B, one or more remote control devices 170, 171 can be used to communicate with the processor of pump 12 or pump 102 to control delivery of medicament and transfer data with pump via a wired or a wireless electromagnetic signal, such as via, e.g., a near field communication (NFC) radio frequency (RF) modality or other RF modalities such as Bluetooth®, Bluetooth® low energy, mobile or Wi-Fi communication protocols, for example, according to embodiments of the present disclosure. Such a remote control can include, for example, a mobile communication device 170, such as a smartphone executing a software application for control of the pump, a dedicated remote controller 171, a wearable electronic watch or electronic health or fitness monitor or personal digital assistant (PDA), etc., or a tablet, laptop or personal computer. Such communications between (and among) the one or more remote control devices 170, 171 and pump may be one-way or two-way for, e.g., effective transfer of data among the devices and the pump, control of pump operations, updating software on the devices and/or pump, and allowing pump-related data to be viewed on the devices and/or pump.

Embodiments of the present invention include components capable of and methods using wired and wireless transmission and receipt of signals for exchange of information and commands between and among any of the components as described herein, including, e.g., between a pump and a smartphone; among a pump, a CGM and a smartphone; between a dedicated remote controller and a pump; among a dedicated remote controller, a CGM and a pump; among a dedicated remote controller, a BGM and a pump, and other combinations as would be contemplated by those of skill in the art.

Figure 6A:
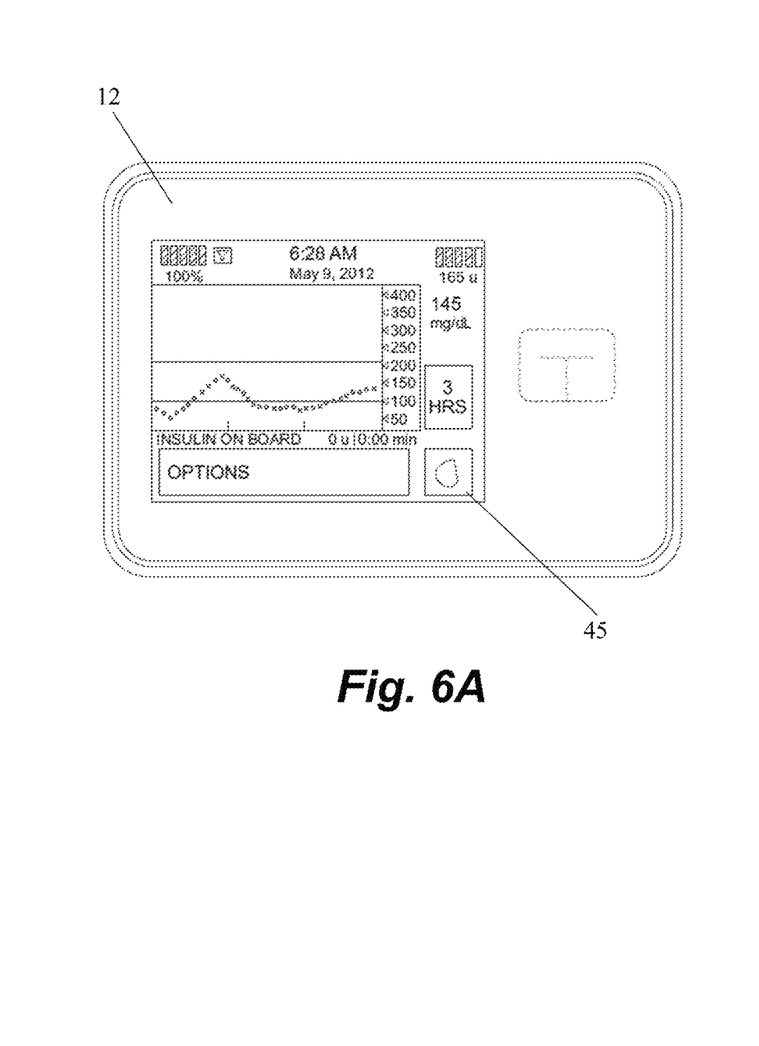
FIGS. 6A-6B depict an ambulatory infusion pump according to the disclosure.
Figure 6B:
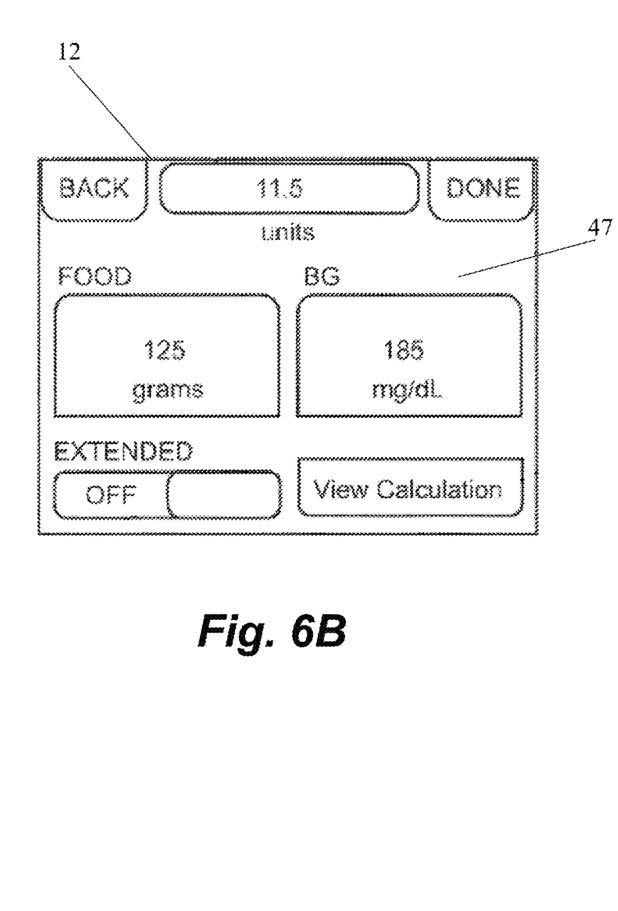
Figure 7A:
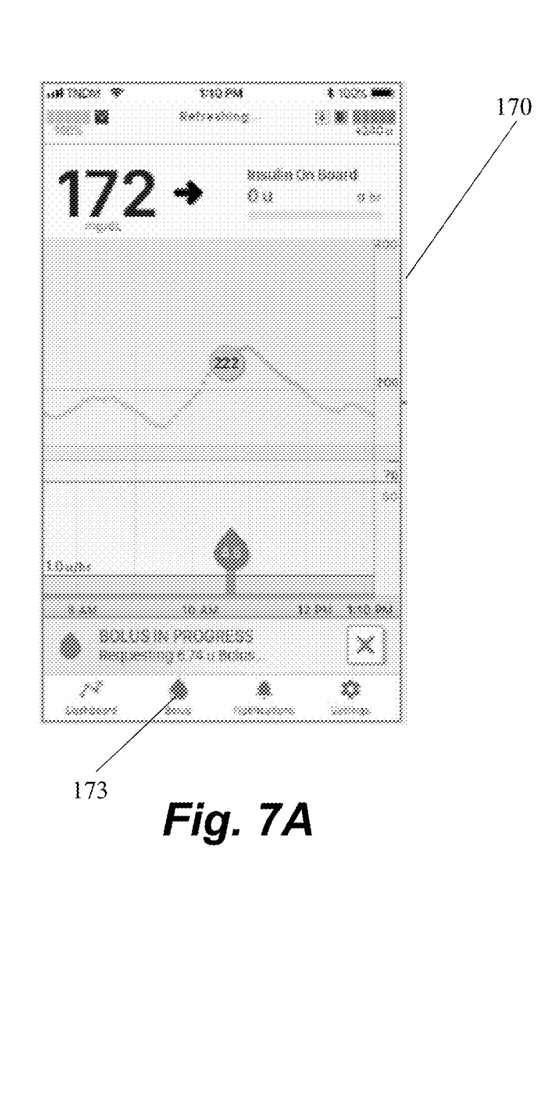
FIGS. 7A-7B depict a remote control device according to the disclosure.
Figure 7B:
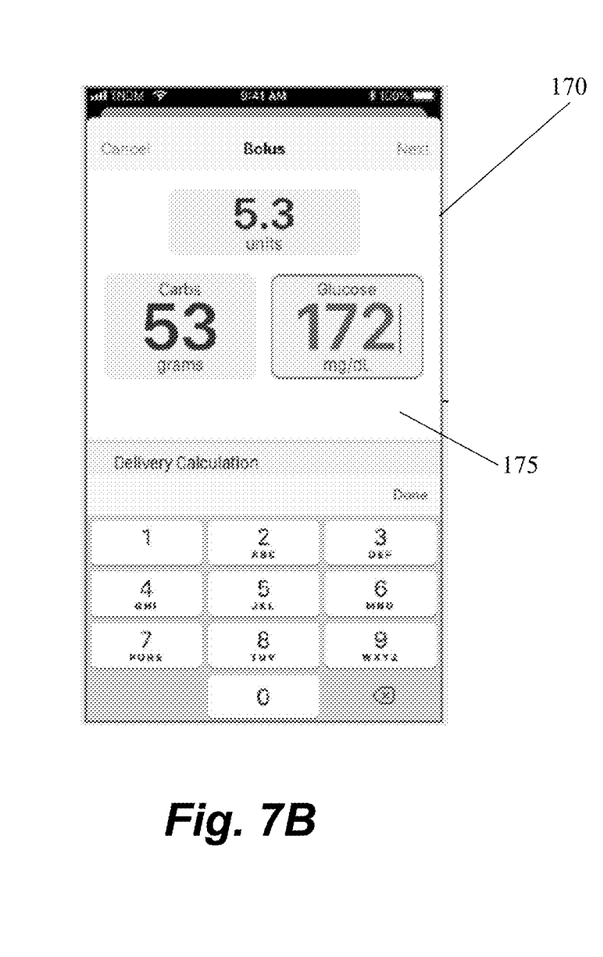

In embodiments in which a smartphone or other remote control device can be used to communicate with and/or control a pump, device programming may be able to be accomplished from both the pump and one or more remote control devices or, in the case of a pump lacking a display screen or other complex programming features such as depicted in FIGS. 3A-3B, more than one remote control device. For example, a bolus programming interface such as screen 47 depicted in FIG. 6B may be able to be displayed on the user interface of pump 12 by selecting a bolus icon 45 on a home screen of the pump of FIG. 6A for receiving user entry to program a bolus and a similar bolus programming interface such as screen 175 depicted in FIG. 7B may be able to be displayed on a smartphone or other remote control device by selecting a bolus icon 173 on a home screen of remote control such as depicted in FIG. 7A. In such circumstances, a bolus could be programmed on both the pump and the remote control device, or from more than one remote control device, at generally the same time. For example, a parent using a mobile device connected to a child's infusion pump may try to initiate a bolus at the same time the child tries to initiate a bolus from the pump's user interface.

In addition, some infusion pump systems provide at least some automatic insulin delivery based on the user's glucose levels according to a closed loop delivery algorithm. In these systems, the closed loop algorithm may periodically determine that an automatic correction bolus is needed and automatically calculate and deliver the bolus. Similar issues may therefore arise in which the closed loop algorithm automatically delivers a correction bolus while a user is in the process of programming a bolus delivery that is then delivered without the user being aware of the auto-bolus. In order to avoid low glucose levels that could result from delivering multiple boluses determined by these various sources when only one bolus was needed, systems and methods disclosed herein provide a bolus permissions and prioritization scheme that prioritizes boluses programmed with the infusion pump and one or more remote control devices and calculated by a closed loop delivery algorithm.

Figure 8:
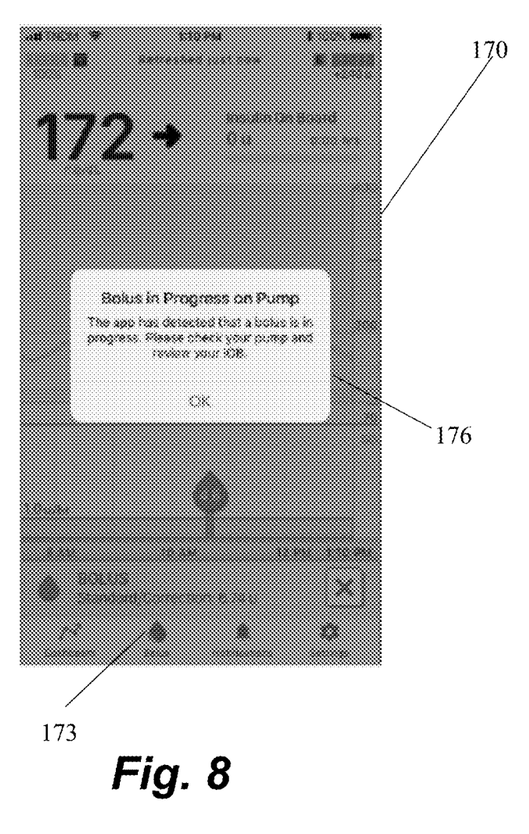
FIG. 8 depict a remote control screen according to the disclosure.

In embodiments, the user interface of the pump can be given highest priority for programming and delivering boluses. In some embodiments, the user interface of a remote control device can be given second priority and the closed loop algorithm can be lowest priority. For example, if a user has accessed the bolus programming screen on the pump, the bolus programming screen on the remote control device can be disabled such that a user would be unable to access the bolus programming screen on the remote device. Referring to FIG. 8, if the pump has higher priority and the user attempts to access the bolus programming screen on the remote device 170 by, e.g., selecting the bolus icon 173 while a bolus request is being programmed on the pump, a message 176 can be displayed informing the user that a bolus is already in progress on the pump and the bolus programming screen on the remote control is inaccessible. For example, the message can state "Bolus in Progress on Pump," and further explain that "The app has detected that a bolus is in progress." The message can further instruct the user to check the status of the pump, such as by stating "Please check your pump and review your JOB."

In some embodiments, when the bolus programming screen on the pump or other higher primary device is accessed, the pump transmits a communication to the remote control or other secondary device(s) to inform the device such that the remote control can disable the remote's bolus programming screen. In other embodiments, when the user selects the bolus 173 icon on the remote control or secondary device, the remote control can query the pump to ensure that the pump bolus programming screen on the pump is not active. In some embodiments, the programming feature on the secondary device can be disabled only while the programming feature on the primary device is active such that the programming feature would be available on the secondary device immediately after the programming feature on the primary device is exited. Alternatively, activation of the programming feature on the primary device can disable the feature on the secondary device for a predetermined period of time, such as, for example 10 minutes, even if the feature is exited on the primary device. In some embodiments, this predetermined period of time can be user-selectable.

Figure 9:
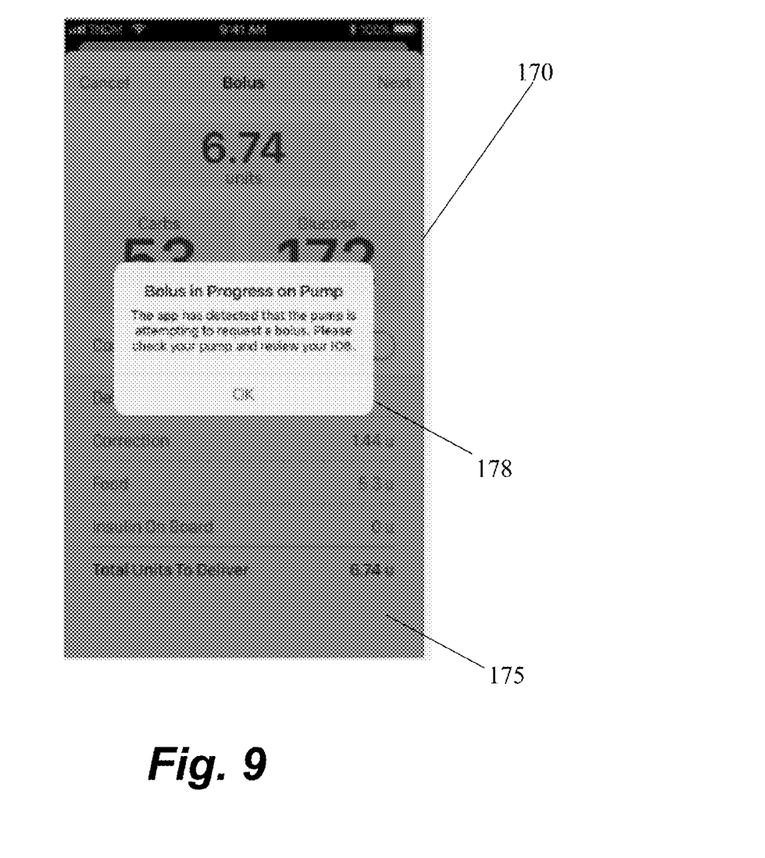
FIG. 9 depict a remote control screen according to the disclosure.

In embodiments where the pump has higher priority than the remote control, if the bolus programming screen 175 is active on the remote control 170 when the bolus programming screen is accessed on the pump, the remote control can automatically exit its corresponding bolus programming screen. FIG. 9 depicts an exemplary message 178 that can be displayed on the remote control 170 in such a circumstance similarly informing the user "Bolus in Progress on Pump," and further stating that "The app has detected that the pump is attempting to request a bolus" with a further instruction to "Please check your pump and review your JOB." Once the user selects "OK" in the message 178, the remote control can revert to the home screen and the bolus programming screen 175 of the remote control 170 can become inaccessible as set forth above as long as the programming screen of the pump is open or for a predetermined period of time.

Figure 10:
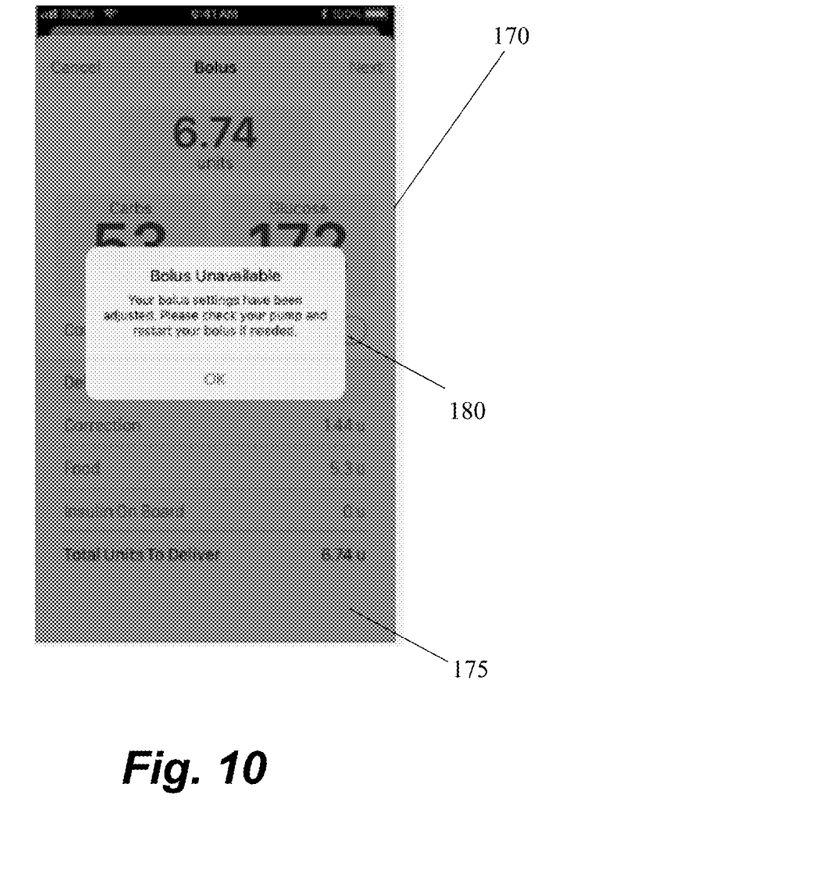
FIG. 10 depict a remote control screen according to the disclosure.

In some embodiments, a higher priority of the pump can also require the user to exit the bolus programming screen 175 on the remote control 170 if any or certain bolus calculation settings are changed on the pump. For example, the bolus calculator for the pump and remote control requires certain user settings such as, for example, the user's correction factor and carbohydrate ratio, a maximum bolus amount, etc. to calculate bolus deliveries. If any of those settings are changed on one device such as the pump while a bolus is being programmed on a second device such as the remote control, an inaccurate bolus could be calculated. The remote control 170 can therefore be required to exit the bolus programming screen 175 and can display a message 180 stating, e.g., "Bolus Unavailable" and "Your bolus settings have been adjusted" as shown in FIG. 10. The user can further be informed that the user needs to exit the bolus programming screen 175 and restart programming the bolus with a message stating, e.g., "Please check your pump and restart your bolus if needed." In some embodiments, such a procedure may be followed only if settings are changed on a higher priority device while a bolus is being programmed on a lower priority device, whereas in other embodiments the above procedure can be carried out when settings are changed on any device while a bolus is being programmed with another device.

In embodiments such as those described above in which the automated insulin delivery algorithm has lower priority than one or more of the pump and a remote control device, the automated insulin delivery algorithm can be prevented from delivering automatic correction boluses whenever the bolus programming screen is active on a higher priority device. For example, some closed loop algorithms receive updated glucose levels and make delivery calculations on a periodic basis, such as, e.g., every 5 minutes. As noted above, in certain circumstances upon receiving an updated glucose reading the algorithm may determine that an automatic correction bolus should be delivered. However, according to embodiments disclosed herein the automatic correction bolus functionality is disabled when a bolus is being programmed on a higher priority device. In some embodiments, the auto-bolus functionality is restricted only when the bolus programming screen is active on one of the higher priority devices such that exiting of the feature re-enables automatic boluses. In other embodiments, auto-boluses can be disabled for a predetermined period of time, such as, for example, 10 minutes upon activation of a bolus programming feature on a higher priority device. In some embodiments, this predetermined period of time can be user-selectable.

A prioritization scheme as described above can also be applied to a system that employs multiple remote control devices. For example, a first remote control device and second remote control device in a system may have a default priority that is equal to each other. However, once the bolus programming feature on, e.g., the first remote control device is accessed, that device is elevated to a higher priority such that the accessibility of the bolus programming feature on, e.g., the second remote control device is provided as set forth above with respect to a lower priority device.

In some embodiments, the pump can always be given highest priority above any remote control devices and the automated insulin delivery algorithm. In other embodiments, priority level can be user-selectable among the pump and one or more remote control devices or among all devices in a system. In such embodiments, the pump may have default highest priority with a user having an ability to elevate one or more other aspects of the system to a higher priority. For example, for a minor child with a pump it may be desirable to let a remote control device of a parent caregiver have higher priority over the pump. In embodiments, although the higher priority device generally has priority for bolus programming, if a bolus request has been completed and transmitted to the pump for delivery from a lower priority device, the bolus programming feature on the higher priority device may become inaccessible for a predetermined period of time.

Some types of infusion pumps may not have a user interface or display on which a bolus programming menu could be displayed and are therefore primarily remote controlled. Referring back to FIGS. 3A-3B, some such pumps include an input button 172, sometimes referred to as a "bolus button," that can be used to deliver a predetermined bolus amount of medicament each time the button is pressed. There is therefore also a risk of low glucose levels if the bolus button is used to deliver a bolus while a remote control device is programming a bolus. As such, in some embodiments, when the bolus programming feature on the remote control device is accessed, the bolus button 172 can be disabled such that pressing the button will not deliver the predetermined bolus amount. In such embodiments, the bolus button 172 can be disabled for a predetermined time after the bolus programming feature is accessed, such as, e.g., 10 minutes or the button can be disabled only when the bolus programming feature is open and enabled after the feature is exited.

Although embodiments disclosed herein are primarily described as providing permissions and priority for programming of boluses, it should be understood that such a permissions and prioritization scheme can be provide to numerous other aspects of pump programming. For example, programming of temporary basal rates or other changes to basal insulin can employ a similar prioritization scheme as that described above.

In an embodiment, an ambulatory infusion pump system can include an infusion pump configured to deliver medicament to a user and having a user interface configured to display a pump bolus programming interface configured to enable the user to program a bolus delivery of medicament with the infusion pump. The system can further include a remote control device configured to send commands to the infusion pump to cause delivery of medicament with the infusion pump including a user interface configured to display a remote bolus programming interface configured to enable the user to program a bolus delivery of medicament with the infusion pump. At least one processor in the system can be configured to associate each of the pump bolus programming interface and the remote bolus programming interface with a priority level such that one of the pump bolus programming interface and the remote bolus programming interface is a higher priority interface and the other is a lower priority interface. The processor can further automatically disable user access to the lower priority interface if the higher priority interface has been accessed.

In some embodiments, the at least one processor is configured to store a default selection of the pump bolus programming interface or the remote bolus programming interface as the higher priority interface.

In some embodiments, the at least one processor is configured to receive user input selecting one of the pump bolus programming interface and the remote bolus programming interface to be the higher priority interface.

In some embodiments, the at least one processor is further configured to cause a message to display on the lower priority interface indicating that the lower priority interface is inaccessible due to the higher priority interface having been accessed.

In some embodiments, the at least one processor is configured to transmit a communication to the device having the lower priority interface when the higher priority interface is accessed to disable the lower priority interface.

In some embodiments, the at least one processor is configured to transmit a communication querying whether the higher priority interface has been accessed when the lower priority interface is accessed.

In some embodiments, the at least one processor is configured to disable user access to the lower priority interface while the higher priority interface is active.

In some embodiments, the at least one processor is configured to disable user access to the lower priority interface for a predetermined period of time after the higher priority interface is accessed.

In some embodiments, the at least one processor is configured to automatically exit the lower priority interface if the lower priority interface is active when the higher priority interface is accessed.

In some embodiments, the at least one processor is configured to automatically exit the lower priority interface if any bolus settings are modified on the device having the higher priority interface.

In an embodiment, an ambulatory infusion pump system can include an infusion pump configured to deliver medicament to a user, a first user interface configured to display a first bolus programming interface to enable the user to program a bolus delivery of medicament with the infusion pump and a second user interface configured to display a second bolus programming interface to enable the user to program a bolus delivery of medicament with the infusion pump. At least one processor can be configured to associate each of the first bolus programming interface and the second bolus programming interface with a priority level such that one of the first bolus programming interface and the second bolus programming interface is a higher priority interface and the other is a lower priority interface. The at least one processor can automatically disable user access to the lower priority interface if the higher priority interface has been accessed.

In some embodiments, the first user interface is part of the infusion pump and the second user interface is part of a remote control device configured to remotely control the infusion pump.

In some embodiments, the first user interface is part of a first remote control device configured to remotely control the infusion pump and the second user interface is part of a second remote control device configured to remotely control the infusion pump.

In some embodiments, the at least one processor is configured to automatically calculate and deliver automatic correction boluses based on glucose levels of the user, and the at least one processor is configured to disable delivery of automatic correction boluses when the higher priority interface has been accessed.

In some embodiments, the at least one processor is further configured to disable delivery of automatic correction boluses when the lower priority interface has been accessed.

In some embodiments, delivery of automatic correction boluses is disabled for a predetermined period of time after the higher priority interface or the lower priority interface has been accessed.

In some embodiments, the at least one processor is configured to disable delivery of automatic correction boluses while the lower priority interface or the higher priority interface is active.

In some embodiments, the infusion pump does not include a display and includes a bolus button configured to enable programming of a predetermined amount of medicament, and wherein the at least one processor is configured to disable the bolus button when the higher priority interface or lower priority interface has been accessed.

In some embodiments, the at least one processor is further configured to cause a message to display on the lower priority interface indicating that the lower priority interface is inaccessible due to the higher priority interface having been accessed.

In some embodiments, the at least one processor is configured to automatically exit the lower priority interface if the lower priority interface is active when the higher priority interface is accessed.

Although the embodiments herein have been specifically described with respect to an ambulatory infusion pump, the inventions disclosed herein could be employed with any other type of programmable medical device capable of receiving and executing remote commands. Such devices include, for example, non-ambulatory pumps, implantable pumps, defibrillators, spinal cord stimulation systems, etc. Embodiments could further include non-medical applications.

Also incorporated herein by reference in their entirety are commonly owned U.S. Pat. Nos. 6,999,854; 8,133,197; 8,287,495; 8,408,421 8,448,824; 8,573,027; 8,650,937; 8,986,523; 9,173,998; 9,180,242; 9,180,243; 9,238,100; 9,242,043; 9,335,910; 9,381,271; 9,421,329; 9,486,171; 9,486,571; 9,492,608; 9,503,526; 9,555,186; 9,565,718; 9,603,995; 9,669,160; 9,715,327; 9,737,656; 9,750,871; 9,867,937; 9,867,953; 9,940,441; 9,993,595; 10,016,561; 10,201,656; 10,279,105; 10,279,106; 10,279,107; 10,357,603; 10,357,606; 10,492,141; 10/541,987; 10,569,016; 10,736,037; 10,888,655; 10,994,077; 11,116,901; 11,224,693; 11,291,763; 11,305,057; 11,458,246; and 11,464,908 and commonly owned U.S. Patent Publication Nos. 2009/0287180; 2012/0123230; 2013/0053816; 2014/0276423; 2014/0276569; 2014/0276570; 2018/0071454; 2019/0307952; 2020/0206420; 2020/0329433; 2020/0368430; 2020/0372995; 2021/0001044; 2021/0113766; 2021/0154405; 2021/0353857; 2022/0062553; 2022/0139522; 2022/0223250; 2022/0233772; 2022/0233773; 2022/0238201; 2022/0265927; and 2022/0344017 and commonly owned U.S. patent application Ser. Nos. 17/368,968; 17/732,208; 17/878,681; 17/879,959; 17/886,998; 17/896,492; 17/961,206; and Ser. No. 17/964,513.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

The invention claimed is:

1. An ambulatory infusion pump system, comprising:
an infusion pump configured to deliver medicament to a user, the infusion pump including a user interface configured to display a bolus programming interface to enable the user to program a bolus delivery of medicament with the infusion pump;
a remote control device configured to send commands to the infusion pump to cause delivery of medicament with the infusion pump, the remote control device including a user interface configured to display a remote bolus programming interface to enable the user to program a bolus delivery of medicament with the infusion pump; and
at least one processor, the at least one processor configured to:
associate each of the pump bolus programming interface and the remote bolus programming interface with a priority level such that one of the pump bolus programming interface and the remote bolus programming interface is a higher priority interface and the other is a lower priority interface; and automatically disable user access to the lower priority interface if the higher priority interface has been accessed.

2. The ambulatory infusion pump system of claim 1, wherein the at least one processor is configured to store a default selection of the pump bolus programming interface or the remote bolus programming interface as the higher priority interface.

3. The ambulatory infusion pump system of claim 1, wherein the at least one processor is configured to receive user input selecting one of the pump bolus programming interface and the remote bolus programming interface to be the higher priority interface.

4. The ambulatory infusion pump system of claim 1, wherein the at least one processor is further configured to cause a message to display on the lower priority interface indicating that the lower priority interface is inaccessible due to the higher priority interface having been accessed.

5. The ambulatory infusion pump system of claim 1, wherein the at least one processor is configured to transmit a communication to the device having the lower priority interface when the higher priority interface is accessed to disable the lower priority interface.

6. The ambulatory infusion pump system of claim 1, wherein the at least one processor is configured to transmit a communication querying whether the higher priority interface has been accessed when the lower priority interface is accessed.

7. The ambulatory infusion pump system of claim 1, wherein the at least one processor is configured to disable user access to the lower priority interface while the higher priority interface is active.

8. The ambulatory infusion pump system of claim 1, wherein the at least one processor is configured to disable user access to the lower priority interface for a predetermined period of time after the higher priority interface is accessed.

9. The ambulatory infusion pump system of claim 1, wherein the at least one processor is configured to automatically exit the lower priority interface if the lower priority interface is active when the higher priority interface is accessed.

10. The ambulatory infusion pump system of claim 1, wherein the at least one processor is configured to automatically exit the lower priority interface if any bolus settings are modified on the device having the higher priority interface.

11. An ambulatory infusion pump system, comprising:
an infusion pump configured to deliver medicament to a user;
a first user interface configured to display a first bolus programming interface to enable the user to program a bolus delivery of medicament with the infusion pump;
a second user interface configured to display a second bolus programming interface to enable the user to program a bolus delivery of medicament with the infusion pump; and
at least one processor, the at least one processor configured to:
associate each of the first bolus programming interface and the second bolus programming interface with a priority level such that one of the first bolus programming interface and the second bolus programming interface is a higher priority interface and the other is a lower priority interface; and
automatically disable user access to the lower priority interface if the higher priority interface has been accessed.

12. The ambulatory infusion pump system of claim 11, wherein the first user interface is part of the infusion pump and the second user interface is part of a remote control device configured to remotely control the infusion pump.

13. The ambulatory infusion pump system of claim 11, wherein the first user interface is part of a first remote control device configured to remotely control the infusion pump and the second user interface is part of a second remote control device configured to remotely control the infusion pump.

14. The ambulatory infusion pump system of claim 11, wherein the at least one processor is configured to automatically calculate and deliver automatic correction boluses based on glucose levels of the user, and wherein the at least one processor is configured to disable delivery of automatic correction boluses when the higher priority interface has been accessed.

15. The ambulatory infusion pump system of claim 14, wherein the at least one processor is further configured to disable delivery of automatic correction boluses when the lower priority interface has been accessed.

16. The ambulatory infusion pump of claim 15, wherein delivery of automatic correction boluses is disabled for a predetermined period of time after the higher priority interface or the lower priority interface has been accessed.

17. The ambulatory infusion pump system of claim 15, wherein the at least one processor is configured to disable delivery of automatic correction boluses while the lower priority interface or the higher priority interface is active.

18. The ambulatory infusion pump system of claim 17, wherein the infusion pump does not include a display and includes a bolus button configured to enable programming of a predetermined amount of medicament, and wherein the at least one processor is configured to disable the bolus button when the higher priority interface or lower priority interface has been accessed.

19. The ambulatory infusion pump system of claim 11, wherein the at least one processor is further configured to cause a message to display on the lower priority interface indicating that the lower priority interface is inaccessible due to the higher priority interface having been accessed.

20. The ambulatory infusion pump system of claim 11, wherein the at least one processor is configured to automatically exit the lower priority interface if the lower priority interface is active when the higher priority interface is accessed.

* * * * *